United States Patent [19]
Edington et al.

[11] B 3,984,761
[45] Oct. 5, 1976

[54] LINE POWERED VOLTAGE REGULATOR

[75] Inventors: John Edward Edington, Holmdel, N.J.; Richard Cecil Fitch, Indianapolis, Ind.

[73] Assignee: Bell Telephone Laboratories, Incorporated, Murray Hill, N.J.

[22] Filed: Aug. 28, 1974

[21] Appl. No.: 501,181

[44] Published under the second Trial Voluntary Protest Program on February 10, 1976 as document No. B 501,181.

[52] U.S. Cl. .............................. 323/22 T; 307/304; 323/9; 323/39; 178/DIG. 11
[51] Int. Cl.² ........................................... G05F 1/58
[58] Field of Search............... 323/1, 4, 9, 22 T, 36, 323/38, 39; 307/304; 178/DIG. 11

[56] References Cited
UNITED STATES PATENTS

| | | |
|---|---|---|
| 3,508,084 | 4/1970 | Warner, Jr............................ 307/304 |
| 3,617,859 | 11/1971 | Dobkin et al........................... 323/4 |
| 3,626,278 | 12/1971 | Matsumura et al. ............... 323/22 T |
| 3,761,801 | 9/1973 | Sheng................................. 323/22 T |
| 3,828,240 | 8/1974 | Keller et al........................ 323/22 T |

*Primary Examiner*—Gerald Goldberg
*Attorney, Agent, or Firm*—A. D. Hooper; C. E. Graves

[57] ABSTRACT

A line powered voltage regulator for producing a regulated voltage from the tip and ring terminals of a telephone line for low-powered circuit applications provides a high a-c impedance, low-current drain, and a very low temperature coefficient over a broad temperature range. The regulator utilizes a voltage sensor having matched transistors formed on a bipolar chip and IGFET elements formed on an IGFET chip for starting the regulator. The voltage sensor has high gain for providing a large control voltage for small changes in the load and for eliminating the effects that aging and temperature of the elements of the regulator might have on the regulation.

16 Claims, 1 Drawing Figure

LINE POWERED VOLTAGE REGULATOR

BACKGROUND OF THE INVENTION

1. Field of the Invention

This invention relates to a line powered voltage regulator for use where high input impedance and low-current drain are required such as in coin telephones.

2. Description of the Prior Art

Various voltage regulators are well known in the art including such regulators as Zener diodes, shunt and series regulators. These existing regulators have various limitations such as excessive quiescent current drain, inadequate temperature compensation, relative complexity, and low imput impedance which prevent their use in some applications. One such application is in a coin telephone where a relatively simple, line powered voltage regulator having high input impedance to a-c signals, low quiescent current drain and good regulation over a broad temperature range is needed.

Accordingly, it is an object of this invention to improve voltage regulators to provide good regulation over a broad temperature range.

Another object is to provide a voltage regulator for applications requiring relatively simple circuits, high input impedance, low quiescent current drain and good regulation over a broad temperature range.

SUMMARY OF THE INVENTION

The foregoing objects and others are achieved in accordance with this invention by a voltage regulator having a drive transistor for supplying current to a load. A high gain voltage sensor circuit monitors the voltage across the load and develops a relatively large control voltage in response to small changes in the regulator or load voltage which controls the base signal to the drive transistor and thereby controls the current supplied to the load. The voltage sensor circuit comprises matched bipolar transistor elements for eliminating the effects of variations in temperature characteristics of the circuit elements. A starting circuit comprising IGFET transistors initially provides base current to the drive transistor until the voltage sensor circuit becomes operational to activate a current source which supplies the base current.

BRIEF DESCRIPTION OF THE DRAWING

The invention will be more fully comprehended from the following detailed description and accompanying drawing in which.

DETAILED DESCRIPTION

Figure 1:
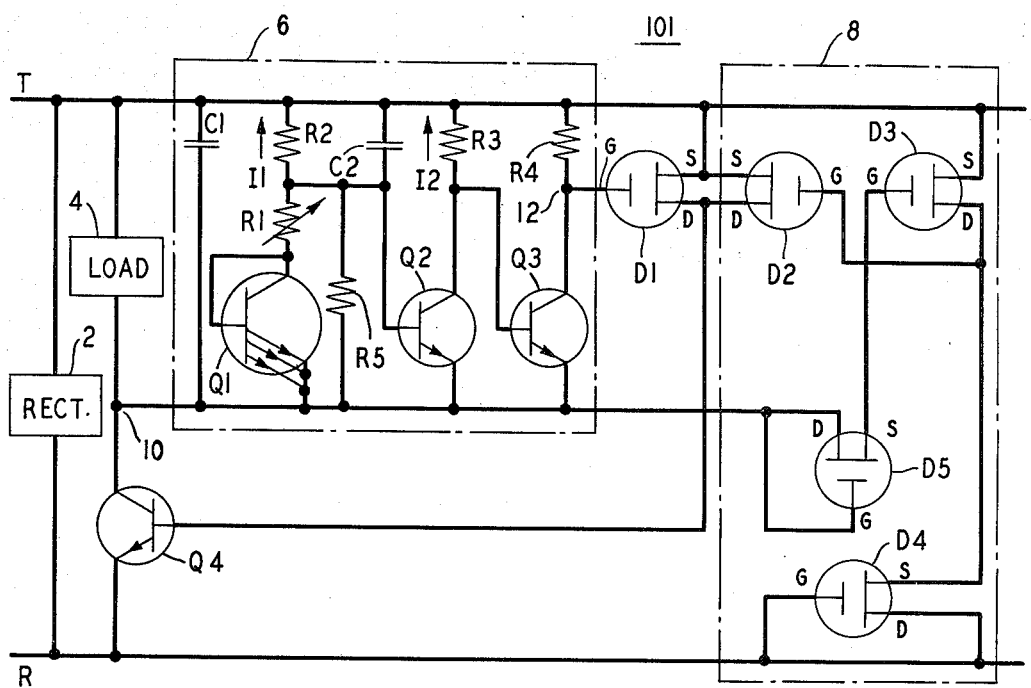
FIG. 1 is a schematic diagram of the voltage regulator of this invention.

Referring now to FIG. 1 there is shown a typical telephone line comprising tip and ring conductors or terminals T and R, respectively, having a well-known rectifier 2 such as a diode bridge connected therebetween to maintain ring conductor R at a negative potential with respect to tip conductor T. A load 4 is connected to tip conductor T and is driven or supplied current from the collector of a drive transistor Q4. Load 4, for example, can comprise the electronic totalizer in a coin telephone. The magnitude of load 4 varies as it performs different functions such as totalizing, switching or signaling in the case of the totalizer. Hence the need arises for regulation of the voltage across load 4 as is provided by regulator 101.

Regulator 101 includes a voltage sensor portion or circuit 6, a current source comprising a first transistor which is designated in FIG. 1 as an IGFET transistor D1 and a starting circuit 8. When a voltage is initially applied between conductors T and R, starting circuit 8 momentarily provides base drive current to drive transistor Q4 until a voltage is developed across load 4. Starting circuit 8 includes second, third, fourth and fifth transistors which are designated in FIG. 1, respectively, as p-channel IGFET transistors D2, D3, D4 and D5. Transistor D4 has its drain and gate electrodes connected to ring conductor R and its source electrode connected to the drain electrode of transistor D3. The source electrode of transistor D3 is connected to tip conductor T and its gate electrode is connected to the source electrode of transistor D5. Transistors D3 and D4 form an invert stage with transistor D4 initially on and transistor D3 initially off when the voltage is initially applied between conductors T and R. This produces a sufficiently negative voltage at the gate electrode of transistor D2 to turn this transistor on and transistor D2 supplies base drive current to drive transistor Q4 from its drain electrode.

The base drive current to drive transistor Q4 causes it to turn on and begin supplying current from its collector electrode to load 4 to develop a voltage thereacross, i.e., the voltage measured between load terminal 10 and conductor T. This voltage causes voltage sensor 6 to produce a control or output voltage at the collector electrode of transistor Q3, i.e., at output terminal 12 as will be explained in more detail subsequently. This control voltage is fed to the gate of transistor D1 and turns this transistor on as soon as it exceeds the preselected threshold thereof. Transistor D1 then becomes the current source for providing base current to drive transistor Q4 and the voltage across load 4 will continue to increase to the predetermined regulated voltage level.

When the voltage begins to develop across load 4, it also appears at the gate and drain electrodes of transistor D5 which are connected to load terminal 10. Transistor D5 is initially off and remains off until the voltage developed across load 4 and applied to the gate electrode, is sufficient to turn transistor D5 on. When transistor D5 turns on, a voltage is applied to the gate electrode of transistor D3 which then turns on this transistor. When transistor D3 turns on, the gate-to-source voltage of transistor D2 is clamped to a voltage less than its threshold and thus transistor D2 turns off. Transistor D1 now supplies all drive current from its drain electrode to the base of drive transistor Q4. Transistor D1 will continue to conduct at an increasing rate supplying increasing base current to transistor Q4 until the operating point is reached as previously stated.

Voltage sensor 6 operates as follows. When drive transistor Q4 turns on the voltage developed across load 4 also turns on sixth, seventh and eighth transistors which are designated in FIG. 1, respectively as transistors Q1, Q2 and Q3, which are n-p-n transistors, to develop an output or control voltage at terminal 12. As this load voltage increases because of the increasing conduction of drive transistor Q4, the emitter current of transistor Q1 also increases in order to provide a corresponding increased voltage across collector resistors R1 and R2. This increased conduction of transistor Q1 also drives transistor Q2 into increased conduction and produces more current through its collector resistor R3. The increased conduction of transistor Q2 decreases the conduction and thereby the emitter current of transistor Q3. The decrease in emitter current of transistor Q3 causes the output or control voltage at terminal 12 to become less negative with respect to tip conductor T because of the lower voltage drop across collector resistor R4. Accordingly, the rate of increase in the conduction of transistor D1 diminishes until equilibrium of the circuit is achieved when the operating point of the regulator is reached. The voltage sensing circuit 6 operates in a similar manner about the operating point when changes occur in the load 4.

The amount of change in the output or control voltage at output terminal 12 with respect to a change in the load voltage at load terminal 10 depends on the gain of voltage sensing circuit 6. As indicated in plot 20 of FIG. 2 a relatively high gain is desired so that, for example, a small change in the load or regulated voltage at terminal 10 will develop a large change in the control voltage at terminal 12 when the operating point of regulator 101 is in the indicated operating ranges 22 and 23 for the temperatures of −40°F and +140°F respectively on the negative slope plot 20. The currents flowing in the circuit loops comprising transistor Q1 and resistors R1, R2 and R5 determine at what load voltage level transistor Q2 will become active. These elements also determine the previously indicated change in base current to transistor Q2 as the load voltage varies. Collector resistor R1 advantageously is an adjustable resistor which can be tuned to establish the gain in the amplification stage formed by transistor Q2 and resistor R3 in the regulation voltage of the regulator 101.

Resistor R5 is large compared with resistor R1 and acts as current divider to provide temperature compensation as follows. The effective resistance of the combination of transistor Q1 and resistor R1 decreases because of a decrease in the base-emitter voltage $V_{BE1}$ of transistor Q1 with an increase in temperature. Likewise the base emitter voltage $V_{BE2}$ of transistor Q2 decreases so that transistor Q2 requires less base current from transistor Q1. The base emitter voltage $V_{BE3}$ of transistor Q3 also decreases with increasing temperature thereby requiring less current from transistor Q2. Resistor R5 connected as shown acts as a current divider to reduce the current fed to the base of transistor Q2 as a result of such temperature increases in transistor Q1 and resistors R1 and R2. Accordingly, the effects of temperature on the control voltage at terminal 12 are reduced.

As mentioned above, resistor R5 is relatively large compared to tuning resistor R1 and therefore its effects can be disregarded in discussing the gain of the amplification stage comprising transistor Q2. With this simplification, the current $I_2$ through collector resistor R3 can be derived from the well known Ebers-Moll equation in terms of the current $I_1$ through resistor R2 as $$I_2 = \frac{I_1}{3} e^{\frac{I_1 R1}{V_t}} \qquad (1)$$

where:

$I_1$ is the current through resistor R2;
$I_2$ is the current through resistor R3;
R1 is the value of tuning resistor R1;
and
$V_t$ is the threshold voltage of transistor Q2.

Thus current $I_2$ increases exponentially as a function of current $I_1$ and depends significantly upon resistor R1. Thus in order to increase the gain of voltage sensor 6, the emitter area of transistor Q1 is increased with respect to the emitter area of transistor Q2 so that the resistance of resistor R1 can be increased. The increased emitter area provides correspondingly lower current densities in transistor Q1 to compensate for the increased value of resistance R1 without altering the temperature characteristics of transistor Q1. Accordingly, the temperature characteristics of transistor Q1 can be made identical to or matched with those of transistor Q2 so that temperature effects in these two transistors cancel. This matching of characteristics can readily be obtained by forming transistors Q1 and Q2 as well as transistor Q3 or a single bipolar chip.

Transistor Q3 and resistor R2 inverts the output from transistor Q2 to provide the required negative feedback, provides further amplification thereto and applies it to the gate electrode of transistor D1. With two stages of amplification, voltage sensor 6 can provide the high gain needed. As earlier discussed any change in the load voltage at terminal 10 will produce a much larger change in the control voltage at terminal 12. This change in control voltage is negative with respect to the change in load voltage and thus tends to return the load voltage to its previous value, i.e., to the operating point of regulator 101. The high gain of voltage sensor 6 substantially masks the effects of changes in the threshold of transistor D1 and the beta of transistor Q4 due to aging and temperature changes.

Capacitor C1 connected across load 4 dampens the response of sensor 6 by suppressing transient changes in load 4. Capacitor C2 connected between tip conductor T and the base of transistor Q2 inhibits any resonance from occurring when regulator 101 is operated on a telephone line. Thus these two capacitors prevent instability in regulator 101 because of the high gain of voltage sensor 6.

The magnitude of load 4 remains constant during the speech mode of operation. Accordingly, regulator 101 will maintain the collector current from drive transistor Q4 to load 4 at a constant value. Thus the a-c impedance presented across conductors T and R by this "constant current" circuit is high and the resulting current drain is very low.

As previously mentioned transistors Q1, Q2, and Q3 advantageously are formed on a single bipolar chip to obtain matched characteristics. Similarly transistor D1, D2, D3, D4 and D5 advantageously are formed on a single IGFET chip. Resistor R1 advantageously comprises a tantalum thin film resistor which provides a broad tuning range.

Figure 2:
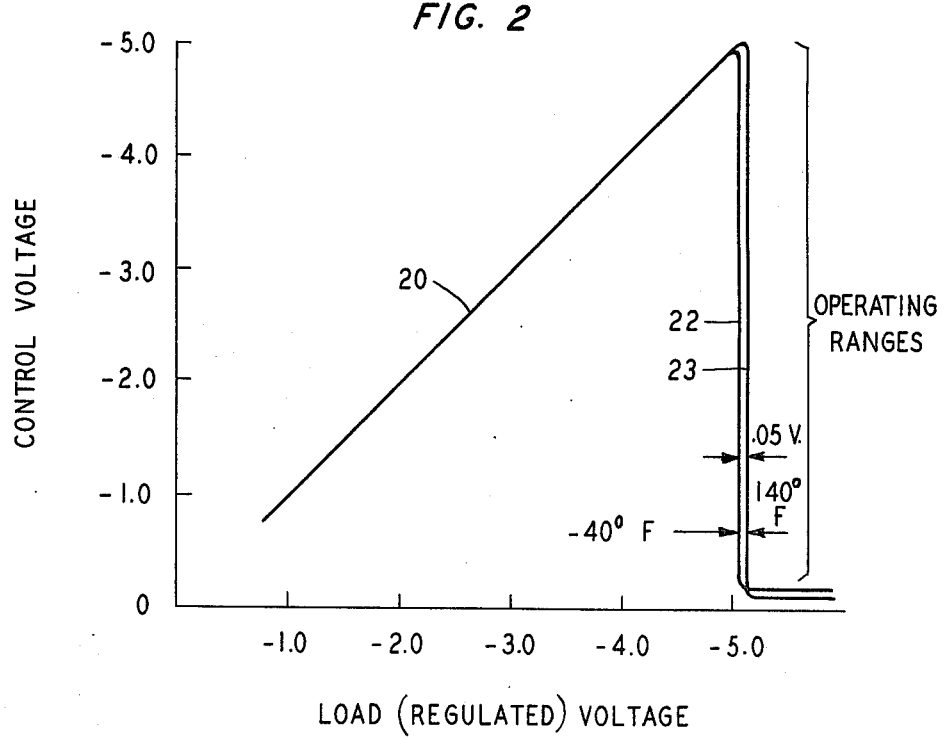
FIG. 2 is a plot of the control voltage versus the regulated or load voltage controlled thereby for the regulator of FIG. 1.

In one specific embodiment of the invention, the various parameters and components of regulator 101 can have the following values: resistor R1 is approximately 6.9 kilohms; resistor R2 equals 300 kilohms; resistor R3 and R4 equal 100 kilohms; resistor R5 equals 140 kilohms; the betas of transistors D1 and Q4 equal 25 $\mu$ mhos/(volts)$^2$ and 100, respectively; capacitors C1 and C2 equal 10 $\mu$F and 0.1 $\mu$F, respectively. The emitter area of transistor Q1 is three times the emitter area of transistor Q2; the magnitude of load 4 can vary from one kilohm to a value in excess of ten kilohms depending on the current leakage at transistor Q4 and the applied potential between conductors T and R is a minimum of approximately 7 volts. With these values, units of the load and control voltages shown in FIG. 2 are volts. Regulator 101 provides a regulation of about 1.2 percent about a nominal load voltage of 5.1 volts over a temperature range of 180°F, i.e., from −40°F to +140°F. This represents a regulation of approximately 0.00067 percent per degree F which is substantially better than most existing voltage regulators.

While the invention has been described with reference to specific embodiments thereof, it is to be understood that various modifications might be made thereto without departing from its spirit and scope.

What is claimed is:

1. A Telephone electrical regulator circuit comprising, in combination;
    first and second line terminals;
    a load terminal;
    an output terminal;
    a drive transistor having base, emitter and collector electrodes with said emitter and collector electrodes connected to said second line terminal and said load terminal, respectively, said drive transistor being adapted to supply a load current to said terminal to develop a reference voltage between said load terminal and said first line terminal;
    a starting circuit connected between said first and second terminals, said starting circuit being responsive to the application of a voltage between said first and second line terminals to supply a drive current to said base electrode of said drive transistor when said reference voltage is less than a preselected threshold, whereby said drive transistor is activated to supply said load current;
    voltage sensing means connected between said load terminal and said first line terminal for sensing said reference voltage and producing a control voltage at said output terminal in response to said reference voltage, said voltage sensing means being responsive to changes in said reference voltage to produce changes in said control voltage, said changes in said control voltage being substantially greater than said changes in said reference voltage; and
    a current source responsive to said control voltage when said reference voltage exceeds said preselected threshold for supplying said drive current to said base electrode of said drive transistor, whereby said reference voltage can be regulated at a preselected level.

2. An electrical regulator circuit comprising, in combination:
    first and second line terminals;
    a load terminal;
    an output terminal;
    a drive transistor having base, emitter and collector electrodes connected to said second line terminal and said load terminal, respectively, said drive transistor being adapted to supply a load current to said load terminal to develop a reference voltage between said load terminal and said first line terminal;
    a starting circuit connected between said first and second line terminals, said starting circuit comprising second, third, fourth and fifth transistors each having gate, source and drain electrodes;
    said second transistor having said gate, source and drain electrodes respectively connected to said drain electrode of said third transistor, said first line terminal, and said base electrode of said drive transistor;
    said third transistor having said gate, source and drain electrodes respectively connected to said source electrode of said fifth transistor said first line terminal and said source electrode of said fourth transistor;
    said fourth transistor having said gate and drain electrodes connected to said second line terminal; and
    said fifth transistor having said gate and said drain electrodes connected to said load terminal, whereby said starting circuit, in response to the application of a voltage between said first and second line terminals, supplies a drive current to said base electrode of said drive transistor when said reference voltage is less than a preselected threshold so that said drive transistor is activated to supply said load current, and whereby said starting circuit ceases to provide said drive current when said reference voltage exceeds said preselected threshold;
    voltage sensing means connected between said load terminal and said first line terminal for sensing said reference voltage and producing a control voltage at said output terminal proportional to said reference voltage; and
    a current source responsive to said control voltage when said reference voltage exceeds said preselected threshold for supplying said drive current to said base electrode of said drive transistor, whereby said reference voltage can be regulated at a preselected level.

3. Apparatus in accordance with claim 2 wherein said first line terminal is positive with respect to said second line terminal and said second, third, fourth and fifth transistors comprise p-channel, insulated gate, field effect transistors.

4. Apparatus in accordance with claim 2 wherein said voltage sensing means comprises sixth, seventh, and eigth transistors each having base, emitter and collector electrodes;
    said sixth transistor having said base and collector electrodes coupled to said first line terminal and said base electrode of said seventh transistor and said emitter electrode connected to said load terminal;
    said seventh transistor having said base and collector electrodes coupled to said first line terminal and said emitter electrode connected to said load terminal; and
    said eighth transistor having said base electrode connected to said collector electrode of said seventh transistor, said collector electrode connected to said output terminal and said emitter electrode connected to said load terminal, whereby said voltage sensing means responds to changes in said reference voltage at said load terminal to produce changes in said control voltage at said output terminal, said changes in said control voltage being substantially greater than said changes in said reference voltage.

5. Apparatus in accordance with claim 4 including:
    first means including first and second resistors coupling said base and collector electrodes of said sixth transistor to said first line terminal;

second means including a third resistor coupling said collector electrode of said seventh transistor to said first line terminal;

third means including a fourth resistor coupling said output terminal to said first line terminal;

fourth means including a fifth resistor and a second capacitor respectively coupling said base electrode of said seventh transistor to said load terminal and said first line terminal, said base electrode of said seventh transistor being connected to said first and second resistors of said first means;

and a first capacitor connecting said load terminal and said first line terminal.

6. Apparatus in accordance with claim 5 wherein said first resistor of said first means comprises an adjustable resistor;

said sixth and seventh transistors have matched thermal characteristics; and said emitters of said sixth and seventh transistors have different areas with said area of said sixth transistor being substantially larger than said area of said seventh transistor.

7. Apparatus in accordance with claim 6 wherein said first line terminal is positive with respect to said second line terminal, and said sixth, seventh and eighth transistors comprise n-p-n transistors formed on a common substrate.

8. Apparatus in accordance with claim 4 wherein said current source comprises a first transistor having gate, source, and drain electrodes respectively connected to said output terminal, said first line terminal and said base electrode of said drive transistor.

9. Apparatus in accordance with claim 8 wherein said first transistor comprises a p-channel, insulated gate, field effect transistor.

10. Apparatus in accordance with claim 1 wherein said voltage sensing means comprises sixth, seventh, and eighth transistors each having base, emitter and collector electrodes;

said sixth transistor having said base and collector electrodes coupled to said first line terminal and said base electrode of said seventh transistor and said emitter electrode connected to said load terminal;

said seventh transistor having said base and collector electrodes coupled to said first line terminal and said emitter electrode connected to said load terminal;

said eighth transistor having said base electrode connected to said collector electrode of said seventh transistor, said collector electrode connected to said output terminal and said emitter electrode connected to said load terminal, whereby said voltage sensing means responds to changes in said reference voltage at said load terminal to produce changes in said control voltage at said output terminal, said changes in said control voltage being substantially greater than said changes in said reference voltage.

11. Apparatus in accordance with claim 1 wherein said current source comprises a first transistor having gate, source, and drain electrodes respectively connected to said output terminal, said first line terminal and said base electrode of said drive transistor.

12. Apparatus in accordance with claim 10 including:

first means including first and second resistors coupling said base and collector electrodes of said sixth transistor to said first line terminal;

second means including a third resistor coupling said collector electrode of said seventh transistor to said first line terminal;

third means including a fourth resistor coupling said output terminal to said first line terminal;

fourth means including a fifth resistor and a second capacitor respectively coupling said base electrode of said seventh transistor to said load terminal and said first line terminal, said base electrode of said seventh transistor being connected to said first and second resistors of said first means;

and a first capacitor connecting said load terminal and said first line terminal.

13. Apparatus in accordance with claim 10 wherein said first resistor of said first means comprises an adjustable resistor;

said sixth and seventh transistors have matched thermal characteristics; and said emitters of said sixth and seventh transistors have different areas with said area of said sixth transistor being substantially larger than said area of said seventh transistor.

14. Apparatus in accordance with claim 10 wherein said first line terminal is positive with respect to said second line terminal, and said sixth, seventh and eighth transistors comprise n-p-n transistors formed on a common substrate.

15. Apparatus in accordance with claim 10 wherein said current source comprises a first transistor having gate, source, and drain electrodes respectively connected to said output terminal, said first line terminal and said base electrode of said drive transistor.

16. Apparatus in accordance with claim 10 wherein said first transistor comprises a p-channel, insulated gate, field effect transistor.

* * * * *